United States Patent [19]

McConnell et al.

[11] Patent Number: 4,481,351

[45] Date of Patent: Nov. 6, 1984

[54] BRANCHED POLYESTER WAXES

[75] Inventors: Richard L. McConnell; Frederick B. Joyner; Jimmy R. Trotter, all of Kingsport, Tenn.

[73] Assignee: Eastman Kodak Company, Rochester, N.Y.

[21] Appl. No.: 509,558

[22] Filed: Jun. 30, 1983

[51] Int. Cl.³ .............................................. C08G 63/02
[52] U.S. Cl. .................................. 528/272; 260/412.6; 528/302; 560/193; 560/198
[58] Field of Search ...................... 260/412.6; 528/272, 528/302; 560/193, 198

[56] References Cited

U.S. PATENT DOCUMENTS

| | | | |
|---|---|---|---|
| 3,249,615 | 5/1966 | Ackermann | 528/302 X |
| 3,590,076 | 6/1971 | Heintzelman et al. | 560/198 |
| 3,699,154 | 10/1972 | Heintzelman et al. | 560/193 X |
| 3,896,098 | 7/1975 | Lasher | 560/198 X |

Primary Examiner—Lucille M. Phynes
Attorney, Agent, or Firm—Clyde L. Tootle; Daniel B. Reece, III

[57] ABSTRACT

This invention relates to new branched polyester waxes which contain particular amounts of tri- or tetrafunctional hydroxyl containing compounds. The branched polyester waxes may be semicrystalline or crystalline solids with melting points less than about 200° C. These polyester waxes are useful as modifiers for ethylene/vinyl acetate copolymer based adhesives and as additives to improve the hardness of polyolefin coatings.

9 Claims, No Drawings

BRANCHED POLYESTER WAXES

DESCRIPTION

This invention relates to new branched polyester waxes which contain particular amounts of tri- or tetrafunctional hydroxyl containing compounds. The branched polyester waxes may be semicrystalline or crystalline solids with melting points less than about 100° C. These polyester waxes are useful as modifiers for ethylene/vinyl acetate copolymer based adhesives and as additives to improve the hardness of polyolefin coatings.

Heretofore, waxes, both natural and synthetic, have been used in formulating adhesives and coatings. The natural waxes generally lack hardness, and coatings containing such waxes are generally soft. In addition, these waxes are in limited supply. The synthetic waxes such as polyolefin waxes provide coatings having hardness properties greater than the naturally occurring waxes. However, some applications require coatings having hardness properties which are greater than that obtainable with the synthetic waxes. Therefore, it would be an advance in the state of the art to provide branched polyester waxes which can be added to polyolefin coating compositions to provide coatings having improved hardness. Also, these branched polyester waxes are also particularly useful as components of ethylene/vinyl acetate copolymer based adhesives to provide adhesives having improved bond strengths.

According to the present invention, it has now been found that new and useful polyester waxes with narrow molecular weight distributions and with melting points up to about 200° C. can readily be prepared. This broad range of melting points is not available from conventional waxes. It is also possible to vary the molecular weight of these waxes and to provide waxes with different rheological characteristics. Thus, polymers with wax-like properties can be prepared which have inherent viscosities in the range from about 0.05 to about 0.39, a melt viscosity of 10 to about 2000, preferably about 50 to about 1000, most preferred about 75 to about 750, and a heat of fusion of less than 26 cal./g. These new waxes are useful as modifiers for ethylene/vinyl acetate copolymer based adhesives and coatings and as modifiers for paraffin and carnauba waxes.

These new polyester waxes may be semicrystalline solids with crystalline melting points ranging up to about 200° C. These new branched polyester waxes are prepared using at least one saturated aliphatic or cycloaliphatic dibasic acid having 4 to 36 carbon atoms, at least one saturated aliphatic or cycloaliphatic glycol having 2 to 12 carbon atoms and controlled amounts of aliphatic triols and/or tetraols such as trimethylolpropane, pentaerythritol, glycerine, and the like. When used in amounts above about 30 mol percent concentration, the trihydric alcohols such as trimethylolpropane cause such extensive branching that the resulting polyester wax cannot be processed in molten form. Suitable dibasic acids include cis or trans 1,4-cyclohexanedicarboxylic, cis or trans 1,3-cyclohexanedicarboxylic, glutaric, adipic, pimelic, suberic, azelaic, sebacic, 1,12-dodecanedioic, dimer acid, and the like. Alkylated succinic anhydrides such as octylsuccinic, tetradecylsuccinic, octadecylsuccinic anhydride, and the like may also be used as a portion of the dibasic acid moiety. The polyesters of this invention also contain one or more selected aliphatic or cycloaliphatic glycols. Useful glycols include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, poly(oxyethylene)glycol, and the like.

These new polyester waxes are readily prepared using typical polycondensation reaction conditions. They may be prepared either by batch or continuous processes based on esterification or transesterification reactions.

Typical polyesterification catalysts which may be used include titanium alkoxides, dibutyltin dilaurate, and combinations of zinc, manganese, or magnesium acetates or benzoates with antimony oxides or antimony triacetate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 115 grams (0.5 moles) of 1,12-dodecanedioic acid, 58.9 grams (0.95 mole) of ethylene glycol, 2.68 grams (0.02 mole) trimethylolpropane, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. After one hour, the metal bath temperature is increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 8 minutes. The flask is then removed from the metal bath and is allowed to cool under a nitrogen atmosphere as the polymer solidifies. A nuclear magnetic resonance (NMR) analysis indicates that the copolyester wax contained 3 mole percent trimethylolpropane moiety.

The branched poly(ethylene 1,12-dodecanedioate) copolyester is an opaque, white color. The polymer has a molecular weight ($M_n$) of 3421, a Thermosel melt viscosity of 130 cp. at 190° C., and a penetration hardness value of <1 (by ASTM D5 method). By DSC analysis, the polymer has a melting point ($T_m$) of 84° C. [heat of fusion ($\Delta H_f$) value of 24.6 cal./g]. The copolyester wax has a hydroxyl number of 49.5 and an acid number of 0.5.

A melt blend is made at 175° C. in a glass flask using 35 g of Elvax 220 copolymer (ethylene/vinyl acetate copolymer containing 28 wt. % vinyl acetate; melt index 150), 30 g of Foral 105 rosin ester tackifying resin (ring and ball softening point 105° C.), 25 g of 150° F. microcrystalline wax, and 10 g of the branched poly(ethylene 1,12-dodecanedioate) copolyester wax. A ⅛-inch molten bead of this blend is applied at 175° C. to a piece of corrugated board and this piece of corrugated board is quickly laminated to another piece of corrugated board. A fiber tearing bond is obtained with this adhesive mixture in about two seconds compression time.

EXAMPLE 2

The procedure of Example 1 is repeated except that 44.175 grams (0.7125 mole) of ethylene glycol and 3.35 grams (0.025 mole) of trimethylolpropane are used to prepare the polyester wax. NMR analysis indicates that the wax is a poly(ethylene 1,12-dodecanedioate) copolyester containing 5 mol percent trimethylolpropane moiety. The wax is an opaque, white color. It has a molecular weight ($M_n$) of 4080, a Thermosel melt viscosity of 260 cp. at 190° C., and a penetration hardness value of <1. By DSC analysis, the wax has a melting point ($T_m$) of 84° C. [$\Delta H_f$=23.6 cal./g.]. The wax has a hydroxyl number of 42.5 and an acid number of 0.8.

A melt blend is made at 175° C. in a glass flask using 30 grams of Elvax 220 copolymer, 10 grams of Foral 105 rosin ester tackifying resin, 70 grams of paraffin wax ($T_m$ 60° C.), and 10 grams of the branched polyester wax described above. This blend is readily melt coated onto kraft paper at 120° C. using a hot doctor blade to provide a hard and glossy 1-mil coating. The coating is not easily scratched with a fingernail and it is readily heat sealed in a Sentinel heat sealer using a jaw temperature of 150° C. and compression time of 0.2 sec.

EXAMPLE 3

The procedure of Example 1 is repeated except that 41.85 grams (0.675 mole) of ethylene glycol and 6.7 grams (0.05 mole) of trimethylolpropane are used to prepare the polyester wax. NMR analysis indicates that the wax is a poly(ethylene 1,12-dodecanedioate) copolyester containing 9 mol percent trimethylolpropane moiety. The polymer is an opaque, white color. It has a molecular weight ($M_n$) of 3155, a Thermosel melt viscosity of 110 cp. at 190° C., and a penetration hardness value of <1. By DSC analysis, the wax has a melting point ($T_m$) of 80° C. [$\Delta H_f$=21.3 cal./g.]. The wax has a hydroxyl number of 65.2 and an acid number of 1.3.

EXAMPLE 4

The procedure of Example 1 is repeated except that 37.2 grams (0.6 mole) of ethylene glycol and 13.4 grams (0.1 mole) of trimethylolpropane are used to prepare the polyester wax. NMR analysis indicates that the wax is a poly(ethylene 1,12-dodecanedioate) copolyester containing 17 mol percent trimethylolpropane moiety. The polymer is an opaque, white color. It has a molecular weight ($M_n$) of 2960, a Thermosel melt viscosity of 140 cp. at 190° C. and a penetration hardness value of <1. By DSC analysis it has melting points ($T_m$) of 38° and 68° C. [total $\Delta H_f$=22.2 cal./g.]. The wax has a hydroxyl number of 82.0 and an acid number of 1.2.

EXAMPLE 5

The procedure of Example 1 is repeated except that 32.55 grams (0.525 mole) of ethylene glycol and 20.1 grams (0.15 mole) of trimethylolpropane are used to prepare the polyester wax. NMR analysis indicates that the wax is a poly(ethylene 1,12-dodecanedioate) copolyester containing 26 mol percent trimethylolpropane moiety. The wax is an opaque, white color. It has a molecular weight ($M_n$) of 2440, a Thermosel melt viscosity of 110 cp. at 190° C., and a penetration hardness value of 6. By DSC analysis, the wax has melting points ($T_m$) of 35° and 62° C. [total $\Delta H_f$=15.9 cal./g.]. The wax has a hydroxyl number of 98.6 and an acid number of 5.4.

EXAMPLE 6

About 100 grams (0.5 moles) of trans dimethyl 1,4-cyclohexanedicarboxylate, 58.9 grams (0.95 mole) of ethylene glycol, 6.7 grams (0.05 mole) trimethylolpropane, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. After one hour, the metal bath temperature is increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 8 minutes. The flask is then removed from the metal bath and is allowed to cool under a nitrogen atmosphere as the polymer solidifies. A nuclear magnetic resonance (NMR) analysis indicates that the copolyester wax contained 10 mole percent trimethylolpropane moiety.

The copolyester is an opaque, white color and has a Thermosel melt viscosity of 130 cp. at 190° C. and a penetration hardness value of 5 (by ASTM D5 (method). By DSC analysis, the polymer has a melting point ($T_m$) of 179° C. [heat of fusion ($\Delta H_f$) value of 14.5 cal./g]. The copolyester wax has a hydroxyl number of 59.5 and an acid number of 1.5.

EXAMPLE 7

About 100 grams (0.5 moles) of trans dimethyl 1,4-cyclohexanedicarboxylate, 67.5 grams (0.75 mole) of 1,4-butanediol, 2.72 grams (0.02 mole) pentaerythritol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. After one hour, the metal bath temperature is increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 8 minutes. The flask is then removed from the metal bath and is allowed to cool under a nitrogen atmosphere as the polymer solidifies. A nuclear magnetic resonance (NMR) analysis indicates that the copolyester wax contained 4 mole percent pentaerythritol moiety.

The copolyester is an opaque, white color and has a Thermosel melt viscosity of 650 cp. at 190° C., and a penetration hardness value of 4 (by ASTM D5 method). By DSC analysis, the polymer has a melting point ($T_m$) of 166° C. [heat of fusion ($\Delta H_f$) value of 12.2 cal./g]. The copolyester wax has a hydroxyl number of 47.2 and an acid number of 0.9.

The polyester waxes of this invention when blended with polyolefins provide coatings compositions for coating to substrates such as kraft paper, milk carton stock, photographic papers, cellulosic sheets, primed metal foils such as aluminum and the like. These polyester waxes can also be blended with ethylene/vinyl acetate copolymers to form adhesives. The coated substrates and adhesives find utility in food packaging, drug and medicine packing and other well known uses.

The invention has been described in detail with particular reference to preferred embodiments thereof, but it will be understood that variations and modifications can be effected within the spirit and scope of the invention.

We claim:

1. A branched polyester wax composition having a melting point less than 200° C., an inherent viscosity of about 0.05 to about 0.39, a melt viscosity of about 10 cp. to about 2000 cp. at 190° C., and a heat of fusion of less than 26 cal./g. derived from aliphatic and cycloaliphatic diacids, and the acid functioning derivatives thereof, about 98 to 70 mole percent linear aliphatic and cycloaliphatic glycols having 2 to 10 carbon atoms as the diol member, and about 2 to 30 mole percent of a member selected from the group consisting of triols and tetraols.

2. A branched polyester wax composition according to claim 1 wherein said aliphatic triol is trimethylolpropane.

3. A branched polyester wax composition according to claim 1 wherein said tetraol is pentaerythritol.

4. A branched polyester wax composition having a melting point less than 200° C., an inherent viscosity of about 0.05 to about 0.39, a melt viscosity of about 50 cp. to about 1000 cp. at 190° C., and a heat of fusion of less than 26 cal./g. derived from aliphatic and cycloaliphatic diacids, and the acid functioning derivatives thereof, about 98 to 70 mole percent linear aliphatic and cycloaliphatic glycols having 2 to 10 carbon atoms as the diol member, and about 2 to 30 mole percent of a member selected from the group consisting of triols and tetraols.

5. A branched polyester wax composition according to claim 4 wherein said aliphatic triol is trimethylolpropane.

6. A branched polyester wax composition according to claim 4 wherein said tetraol is pentaerythritol.

7. A branched polyester wax composition having a melting point less than 200° C., an inherent viscosity of about 0.05 to about 0.39, a melt viscosity of about 75 cp. to about 750 cp. at 190° C., and a heat of fusion of less than 26 cal./g. derived from aliphatic and cycloaliphatic diacids, and the acid functioning derivatives thereof, about 98 to 70 mole percent linear aliphatic and cycloaliphatic glycols having 2 to 10 carbon atoms as the diol member, and about 2 to 30 mole percent of a member selected from the group consisting of triols and tetraols.

8. A branched polyester wax composition according to claim 7 wherein said aliphatic triol is trimethylolpropane.

9. A branched polyester wax composition according to claim 7 wherein said tetraol is pentaerythritol.

* * * * *